United States Patent
Cisar et al.

(10) Patent No.: US 7,170,873 B1
(45) Date of Patent: Jan. 30, 2007

(54) METHOD TO DECOUPLE ASSESS POINT ASSOCIATION FROM DIRECTIONAL ANTENNAS

(75) Inventors: James M. Cisar, Wadsworth, OH (US); Michael S. Dollard, Brecksville, OH (US)

(73) Assignee: Cisco Technology, Inc., San Jose, CA (US)

( * ) Notice: Subject to any disclaimer, the term of this patent is extended or adjusted under 35 U.S.C. 154(b) by 874 days.

(21) Appl. No.: 09/943,232

(22) Filed: Aug. 30, 2001

(51) Int. Cl.
*H04Q 7/00* (2006.01)
(52) U.S. Cl. .................................. 370/334; 455/562.1
(58) Field of Classification Search ............... 370/208, 370/338, 210, 329, 343, 334; 455/509, 510, 455/562.1, 561
See application file for complete search history.

(56) References Cited

U.S. PATENT DOCUMENTS

| | | | |
|---|---|---|---|
| 6,032,047 A * | 2/2000 | Cerwall et al. ............. 455/450 |
| 6,181,955 B1 * | 1/2001 | Dartois ..................... 455/562.1 |
| 6,430,148 B1 * | 8/2002 | Ring .......................... 370/208 |
| 6,625,134 B1 * | 9/2003 | Ji et al. ...................... 370/331 |
| 6,628,949 B1 * | 9/2003 | Park .......................... 455/436 |
| 6,671,495 B1 * | 12/2003 | Lappetelainen et al. . 455/67.11 |
| 6,768,913 B1 * | 7/2004 | Molnar et al. ........... 455/562.1 |
| 6,816,706 B1 * | 11/2004 | Hohnstein et al. ............ 455/25 |
| 6,836,484 B2 * | 12/2004 | Suzuki ....................... 370/465 |
| 2001/0014588 A1 * | 8/2001 | Ishida ......................... 455/69 |
| 2002/0086708 A1 * | 7/2002 | Teo et al. ................... 455/561 |

\* cited by examiner

*Primary Examiner*—Chau Nguyen
*Assistant Examiner*—Jung Park
(74) *Attorney, Agent, or Firm*—Tucker, Ellis, & West LLP

(57) ABSTRACT

A method and implementation for network communication is disclosed where one or more network access points are provided for communicating with a plurality of clients over a plurality of carriers. An arrangement is provided for monitoring on or more dedicated carriers for new clients seeking to associate with the network. The new client is detected over the carrier or carriers and he new client is then associated to the network over the carrier or carriers.

18 Claims, 3 Drawing Sheets

METHOD TO DECOUPLE ASSESS POINT ASSOCIATION FROM DIRECTIONAL ANTENNAS

BACKGROUND OF THE INVENTION

The present invention is directed to the field of wireless local area network (WLAN) technology, particularly for associating new clients to high-throughput WLANs. Higher data rates have been obtainable for WLANs, particularly under the new IEEE 802.11a standard. This has enabled customers to deploy WLANs in order to exploit the benefits of a wireless network, namely mobile network access and reducing the infrastructure costs of hard-wiring buildings, as with a traditional LAN. At present, data rates of 11 Mbps are found to be adequate. As future WLAN deployments become popular with customers, the performance demands will increase.

In a typical WLAN, an access point is in wireless communication with a plurality of mobile clients, who access the WLAN through the access point. The access point broadcasts and transmits with spatially-separated clients using an omnidirectional antenna, that communicates in a 360 degree field around the access point. This scheme does not allow for much expansion as performance demands increase. The present 802.11b standard is limited in that only three unique channels can be established in the 2.4 GHz band. This results in a limitation on the number of concurrent wireless connections that can be supported by the cells of the WLAN. (A "cell" is the area covered by a particular wireless network access point, through which wireless mobile clients gain access to the WLAN.) Since so few channels are available, the network cannot assign unique channels to adjacent and nearby cells so that each cell is not adversely affected by neighboring cells. Consequently, some cells must be held off while communication occurs in other cells, thereby reducing data throughput and other network efficiency factors.

In response to these limitations and increased WLAN demands, the 802.11a standard enables the use of a new unlicensed band at 5.2 GHz, allowing as many as eight channels to be established, thereby relieving overcrowding and interference in the 2.4 GHz band. If cell size is reduced by reducing power in each cell, a frequency assignment plan can be developed to provide maximum on-air capacity by limiting the number of clients served by each access point. However, the number of access points must necessarily be increased to cover the same service area, thereby increasing network overhead.

Under the 802.11a standard, data throughput can be increased by employing OFDM (orthogonal frequency division multiplexing) modulation to allow data rates of up to 54 Mbps while reducing the negative effects of in-building reflections of the RF signal energy. As shown in FIG. 1 OFDM operates over channels 10 having a fixed bandwidth divided into a number of subcarriers 12, preferably 52 subcarriers. A data stream is transmitted as a number of parallel streams, each carrying a portion of the data. Each parallel data stream is carried over a separate subcarrier 12. Each subcarrier 12 is a narrowband frequency segment having the desirable property of being "orthogonal" to the adjacent subcarrier. As illustrated in FIG. 2, frequency division is "orthogonal" in that adjacent subcarrier frequency segments 12 are 90 degrees out of phase such that alternating subcarriers respectively vary as sine and cosine functions. In other words, the distribution of amplitude for each frequency within a subcarrier 12 is such that an amplitude "null" is formed at the peak frequency of each neighboring subcarrier segment. This is a desirable feature for demodulating the subcarriers 12 of each channel 10 to extract the data, since little of the adjacent subcarrier energy overlaps into the neighboring subcarrier pass bands. In this way, interference is reduced between adjacent subcarriers, providing a narrow frequency spectrum for a specific data rate, thereby improving data throughput efficiency.

In addition to modulation and coding techniques such as OFDM, other tools available to improve on-air capacity in a WLAN include channel assignment, TDMA (Time Division Multiple/Access) and SDMA (Space Division/Multiple Access). SDMA makes use of adaptive directional antennas to create a desired antenna pattern for communicating between an access point and a selected mobile client. A circular array 20 of eight dipole antennas 22 is shown in FIG. 3 for allowing an access point 24 to communicate with a desired mobile client. The antenna array 20 is used to create an antenna pattern whereby a gain pattern 26 is directed to a desired client C1, allowing communication. Areas outside the gain pattern 26 are "nulls" and are outside the envelope of communication with the antenna. In this way, directional gain and null patterns can be steered to respectively communicate with desired clients and avoid sources of interference.

In this way, adaptive antennas permit spatial diversity, i.e. allowing isolated communication on the same channel and concurrent between positions in space, and in the same cell. This would be achieved by operating more transmit and receive circuitry in parallel on the access point 24. By properly steering gain patterns and nulls between multiple clients, more efficient use of air time is enabled than is possible with a simple dipole antenna having an omnidirectional pattern. In this manner, an access point 24 can modify its antenna patterns to fit the spatial distribution of clients, thereby allowing cells to be packed more closely together and enabling a high level of coordination between access points. Such spatial diversity has many benefits: range is extended in communicating with clients; interference is reduced between clients operating on the same channel; a greater number of simultaneous connections are enabled. In these ways, the service area is expanded and throughput efficiency is enhanced.

While SDMA using directional antennas increases throughput, certain difficulties are encountered for clients and access points seeking to associate with each other as mobile clients move from one cell to another. In a typical previous-type WLAN where the access point uses an omnidirectional antenna, the access point periodically sends out a beacon signal. A new client entering the cell will hear this signal and respond with a request to be associated with the access point. The access point allows a defined interval following the beacon during which the access point expects to receive such requests for association. However, this established method does not extend to an SDMA system employing adaptive directional antennas. In a WLAN that employs adaptive antennas, there is a risk that a client will not be "seen" by the antennas when the client moves into a new cell or first comes alive. Specifically, the network AP's would be pointing their antenna patterns at those clients already associated with the network. Thus, nulls would be steered at the new clients, thereby preventing the process of association.

The practical deficiencies of SDMA are depicted in FIG. 3. A client C1 is associated with AP1, a first access point 24 governing that cell, in which its antenna array 20 steers the gain pattern in communication with client C1. Mobile client C2 roams into the cell defined by AP1. In order to identify C2 as a new client, AP1 would need to periodically break off from C1 and sweep its gain pattern 26 in an omnidirectional manner into null areas to transmit a "beacon" signal. Client C2 would have a prescribed interval to hear this signal and respond with a request to be associated. However, such operation would require that data transfer be halted to associated clients. Even if AP has the parallel circuitry and multiple antenna elements to concurrently communicate with multiple spatially separated clients, by periodically switching to an omnidirectional beacon mode for associating new clients, it is necessary to drop or suspend communications with associated clients such as C1. This would subtract access time from associated clients, reducing data throughput and network efficiency. Another option would be to use an omnidirectional antenna in conjunction with the adaptive antennas to periodically broadcast a message to help new clients associate. However, this would either also subtract access time or create interference for associated clients. In this way, drawbacks are encountered along with the advantages of employing adaptive antennas.

WLANs, particularly those that use omnidirectional antennas, encounter difficulties resulting from the "hidden node" problem. In this situation, two clients may be separated by a great distance and not aware of each other. They may transmit at the same time, and though the access point may hear both, the clients cannot hear each other. This results in "packet collisions" where data packets over the same channel interfere, resulting in "drop outs" and other data loss. This issue is addressed in the IEEE 802.11 specification by the CSMA/CA protocol (Carrier Sense Multiple Access/Collision Avoidance). This requires that time be divided into intervals of possible contention and intervals when collision is to be avoided. Clients are assigned a time reference from the access point, and requires intervals where all associated clients avoid unscheduled transmission so that one particular client can communicate with the access point. The problem can still arise if an unassociated client enters the cell and transmits on that channel, resulting in more packet collisions and interference. When such collisions occur, clients must delay retransmission for a random interval of "backoff time." In this way, one client succeeds in communicating with the access point while others are held off the air. This backoff time resulting from packet collisions is a further source of inefficiency.

SUMMARY OF THE INVENTION

In view of the difficulties and drawbacks associated with previous systems, there is a need for a WLAN with spatial diversity that enables new client association.

There is also a need for a WLAN that permits new client association without significant reduction in network throughput.

There is also a need for WLAN that reduces packet collisions from new unassociated clients.

There is also a need for a WLAN with increased versatility of operation.

These needs and others are satisfied by the method and implementation for network communication according to the present invention. One or more network access points are provided for communicating with a plurality of clients over a plurality of carriers. An arrangement is provided for monitoring on or more dedicated carriers for new clients seeking to associate with the network. The new client is detected over the carrier or carriers and the new client is then associated to the network over the carrier or carriers.

As will be realized, the invention is capable of other and different embodiments and its several details are capable of modifications in various respects, all without departing from the invention. Accordingly, the drawing and description are to be regarded as illustrative and not restrictive.

DETAILED DESCRIPTION OF THE INVENTION

Improved results over previous-type WLAN schemes are obtained with the method and implementation of network communication in accordance with the present invention. One or more network access points 24, are provided for communicating with a plurality of clients over a number of channels, where each channel includes a plurality of carrier frequency bands. As a special feature of the invention, the access point 24 is equipped with the capability for monitoring one or more dedicated carrier frequency bands for new clients seeking to associate with the network. A new client entering the cell or coming alive within the cell preferably detects a beacon signal from the access point 24 over the dedicated carrier band and sends a response to the access point 24 requesting association. Alternatively, the client may send an association request directly to the access point 24 upon activating within the cell. In either case, the dedicated carrier is monitored and new clients are detected over the dedicated carrier. Upon detection, the new client is associated to the network according to standard protocols, and using an implementation (hardware, firmware or software) within the access point 24. The association process can occur either over the dedicated carrier or carriers or over the regular channels defined by the plurality of carrier frequency bands.

Figure 1:
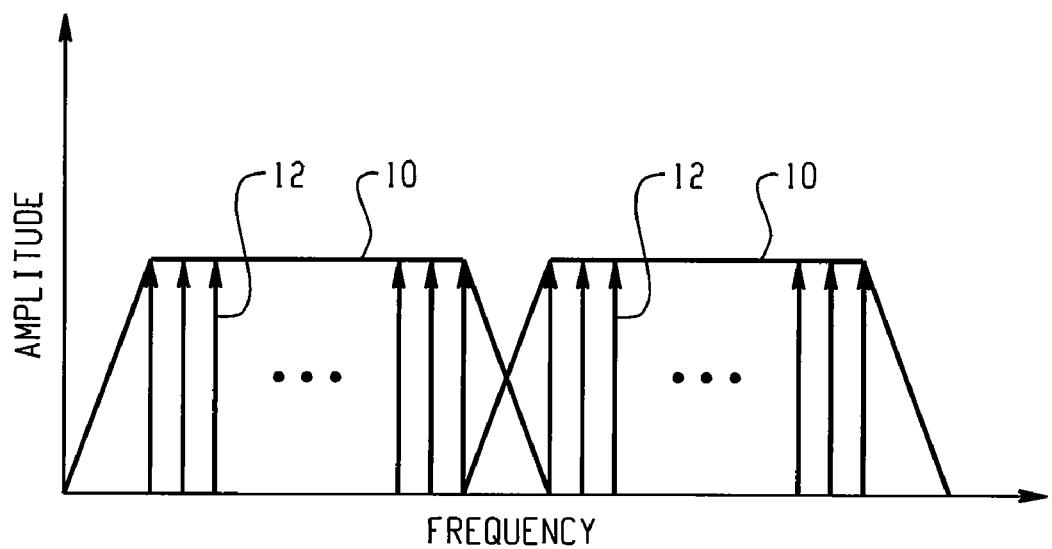
FIG. 1 is a graph depicting typical channels and carriers employed by an OFDM signal, as used in accordance with the present invention.
Figure 2:
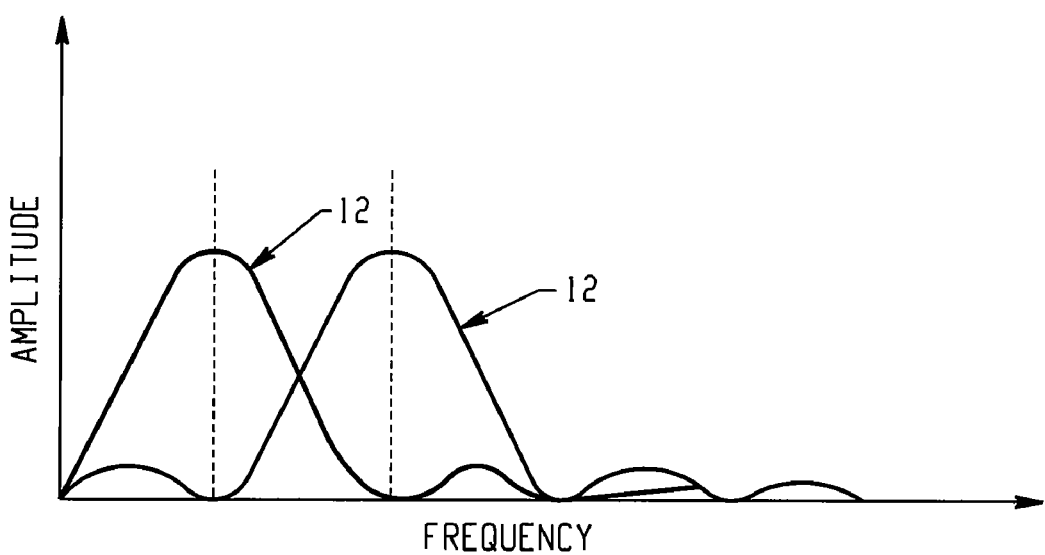
FIG. 2 generally depicts the distribution of subcarriers in an OFDM modulated signal, as is used in accordance with the present invention.

In the preferred embodiment, the channels and their plurality of carriers are OFDM based, as shown in FIGS. 1 and 2 and one or more of the OFDM subcarriers are associated as the dedicated carrier. According to the IEEE 802.11a standard, 52 subcarriers are provided for OFDM channels. Of those, 48 subcarriers are used for data transmission, and the other four are pilot tones for frequency and phase references. Of the 48 subcarriers, one or more could be dedicated for association. For example, if only one subcarrier is defined as the dedicated carrier for association, the reduction in data throughput would be ⅟₄₈ or only about 2%. Of course, more than one subcarrier could be dedicated for association, increasing the available opportunities for association in exchange for additional minor throughput penalties.

By comparison, the 802.11a protocol requires the access point to send beacons at regular intervals, and for providing a period of duration for the association process to occur. This is "dead air" time in which no data throughput occurs, and represents a reduction in network efficiency. Thus, the minor cost in bandwidth of the present invention can be less than the cost of dedicating the access point to association for a defined time period at regular intervals. The benefits of the invention will become even more significant in the future as throughput increases. Also, with a previous-type system it would be necessary to implement one or more complex spatial algorithms to handle Quality of Service (QoS) concerns for associated clients while admitting new clients to the WLAN. The present invention therefore offers clear benefits in reducing system overhead while improving network throughput efficiency.

Figure 3:
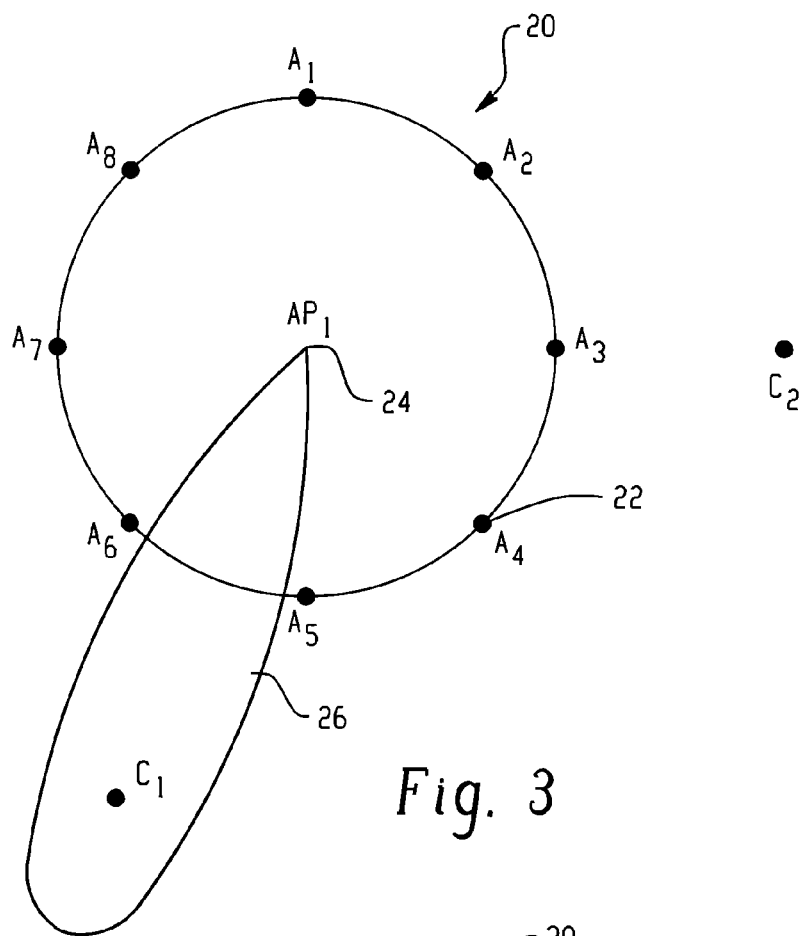
FIG. 3 generally depicts an access point employing an eight-element directional antenna having an antenna pattern directed to a client, in accordance with an embodiment of the present invention.
Figure 4:
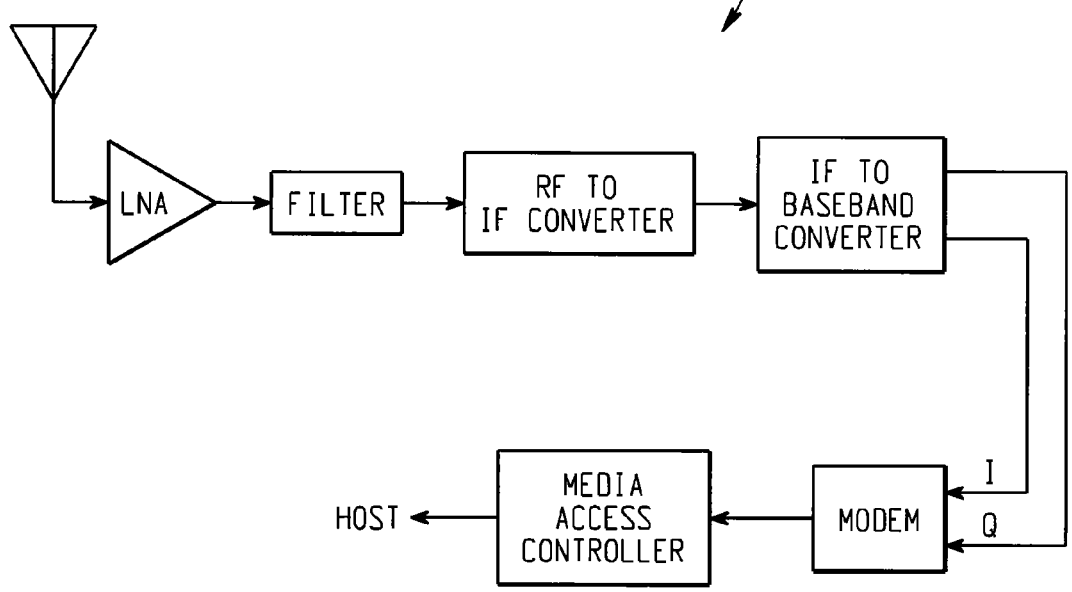
FIG. 4 is a block diagram showing an OFDM receiver as used in accordance with the present invention.
Figure 5:
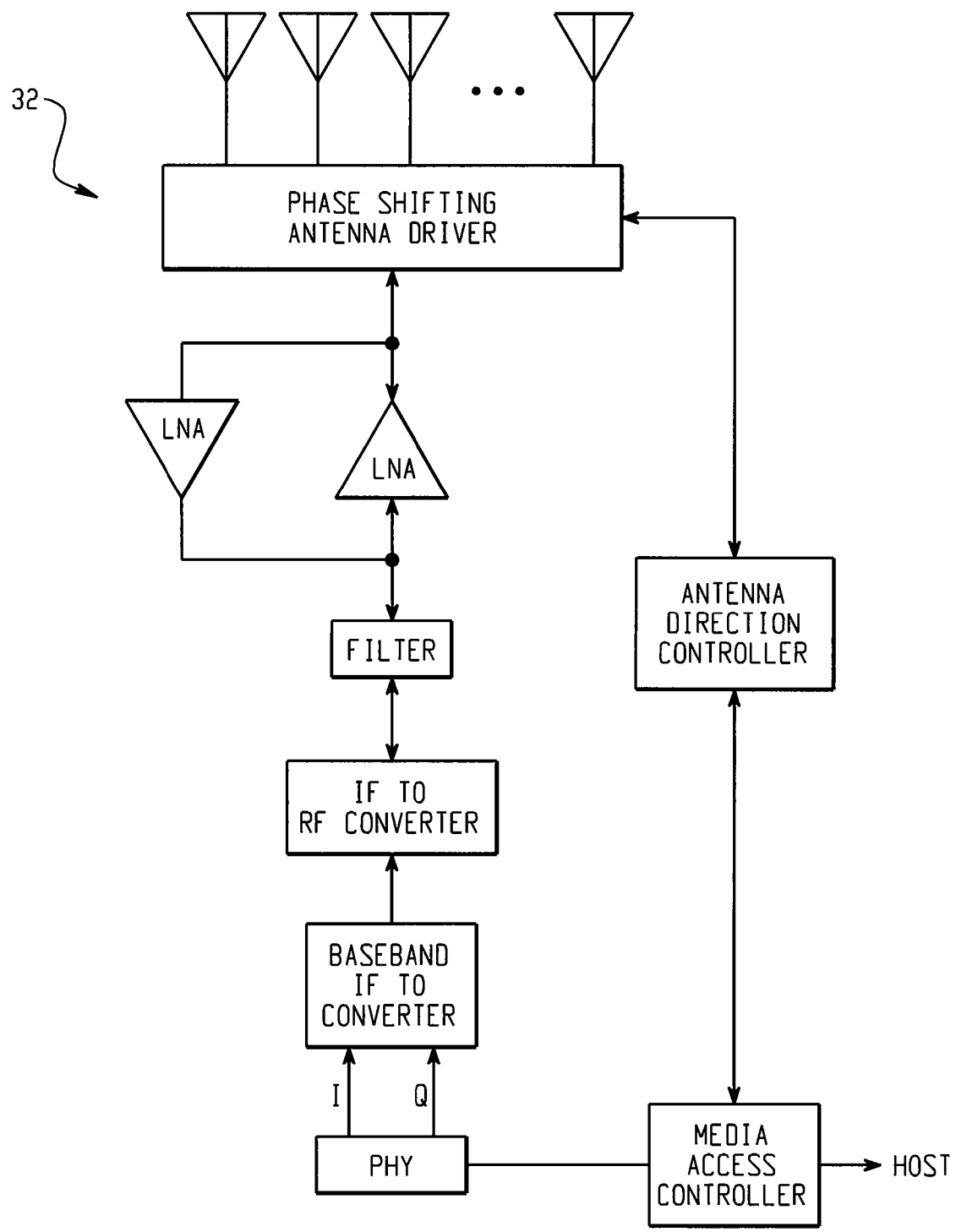
FIG. 5 is a block diagram showing an OFDM transmitter as used in accordance with the present invention.

In the preferred embodiment, the access point 24 of the present invention employs an array 20 of adaptive directional antennas 22 as shown in FIG. 3. However, it should be understood that the dedicated carrier method and implementation of the present invention could be just as easily adapted for use with an access point employing an omnidirectional antenna. In either case, the access point 24 of the present invention employs a distinct omnidirectional antenna function for communicating over the dedicated carrier, in parallel with the antenna or antennas used for data exchange with clients. The access point 24 includes distinct receive and transmit circuitry for exclusively operating this omnidirectional antenna. In the preferred embodiment, any of the antennas 22 in the array 20 show in FIG. 3 can be used in an omnidirectional sense. The antenna pattern steering of an adaptive antenna array 20 is realized by modifying the phase of a transmit signal to each of the antenna elements 22. The directional gain results from a coherent combination of the transmitted or received RF energy. Each antenna 22 receives signals omnidirectionally, but in a phase and amplitude relationship with the other antenna elements 22. Thus, by providing separate signal processing circuitry, the dedicated carrier can be monitored by any of the antenna elements 22, to concurrently process association with new clients and continue association with spatially identified clients 26. An exemplary OFDM receiver 30 is shown in FIG. 4, while an exemplary OFDM transmitter 32 is shown in FIG. 5. Such implementations are comprised of standard components such as are understood in the art, and can be employed for implementing the present method.

By offering a dedicated channel for the association of new clients, the present invention also reduces the incidence of packet collisions from new, unassociated clients and reduces the resulting backoff time and consequent network inefficiency. By continuing communication with associated clients and associating with new clients on a different dedicated carrier, packet collisions are virtually precluded. Including allowances for backoff time, a typical efficiency under the 802.11a standard would be low as compared to 98% when employing a single dedicated channel as with the present method. Also, the present method is more power efficient in terms of energy use compared with bits per second. During backoff times, the client's electronics are in a "full awake" mode, and consume power while idling. With the present invention, the client is able to communicate continuously, without having periods of power consumption with no communication.

As described hereinabove, the present invention solves many problems associated with previous type systems. However, it will be appreciated that various changes in the details, materials and arrangements of parts which have been herein described and illustrated in order to explain the nature of the invention may be made by those skilled in the area within the principle and scope of the invention will be expressed in the appended claims.

We claim:

1. A method of wireless network communication comprising:
    communicating over a plurality of carriers using an adaptive array antenna between at least one network access point and a plurality of clients;
    monitoring at least one dedicated carrier with an omnidirectional antenna for new clients seeking to associate with the network;
    detecting a new client over the at least one dedicated carrier; and
    associating the new client to the network
    wherein the communicating using an adaptive array antenna and monitoring at least one dedicated carrier with an omni-directional antenna occur concurrently.

2. The method of claim 1 wherein the step of communicating over a plurality of carriers comprises communicating over orthogonal frequency division multiplexing frequencies.

3. The method of claim 1, wherein the associating the new client to the network further comprises exchanging data with the new client on the dedicated carrier to associate the new client.

4. The method of claim 1, wherein the associating the new client to the network further comprises exchanging data with the new client via the plurality of carriers using the adaptive array antenna.

5. The method of claim 1, wherein the adaptive antenna array forms at least one directional antenna.

6. An implementation for network communication comprising:
    at least one network access point for communicating with a plurality of clients over a plurality of carriers;
    means for monitoring at least one dedicated carrier selected from the plurality of carriers for new clients seeking to associate with the network with an omni-directional antenna;
    means for exchanging data with the plurality of clients with unselected carriers from the plurality of carriers employing an adaptive array antenna;
    means for detecting a new client over the at least one dedicated carrier; and
    means for associating the new client to the network;
    wherein the means for monitoring and the means for exchanging data operate concurrently.

7. The implementation of claim 6 wherein the plurality of carriers comprises orthogonal frequency division multiplexing frequencies.

8. An access point for operating on a plurality of frequencies, wherein at least one of the plurality of frequencies is a selected frequency and the remaining of the plurality of frequencies are unselected frequencies, comprising:
    a first antenna;
    a first transmit and receive circuitry for communicating with a client associated with the access point, the first transmit and first receive circuitry coupled to the first antenna array using the unselected frequencies;
    a second antenna; and
    a second transmit and receive circuitry for detecting a new client not associated with the access point, the second transmit circuitry and second receive circuitry coupled to the second antenna and using the selected frequency;
    wherein the first transmit and receive circuitry operate concurrently with the second transmit and receive circuitry; and wherein the access point is responsive to detecting the new client to exchange signals with the new client on the unselected frequencies via the second antenna to associate the new client.

9. The access point of claim 8, wherein the first antenna is an adaptive array antenna.

10. The access point of claim 8, wherein the second antenna is an omni-directional antenna.

11. The access point of claim 8, wherein the first antenna is an omni-directional antenna and the second antenna is an omni-directional antenna.

12. The access point of claim 8, wherein the first antenna is an adaptive antenna array and forms at least one directional antenna.

13. The access point of claim 8, wherein the plurality of carriers comprises orthogonal frequency division multiplexing frequencies.

14. An access point for operating on a plurality of frequencies, wherein at least one of the plurality of frequencies is a selected frequency and the remaining of the plurality of frequencies are unselected frequencies, comprising:
   a first antenna;
   a first transmit and receive circuitry for communicating with a client associated with the access point, the first transmit and first receive circuitry coupled to the first antenna array using the unselected frequencies;
   a second antenna; and
   a second transmit and receive circuitry for detecting a new client not associated with the access point, the second transmit circuitry and second receive circuitry coupled to the second antenna and using the selected frequency;
   wherein the first transmit and receive circuitry operate concurrently with the second transmit and receive circuitry;
   wherein the access point is responsive to detecting the new client to exchange signals with the new client on the selected frequency to associate the new client; and
   wherein the access point exchanges signals with the clients associated with the access point using the unselected frequencies via the first antenna to associate the new client.

15. The access point of claim 14, wherein the first antenna is an adaptive array antenna.

16. The access point of claim 14, wherein the second antenna is an omni-directional antenna.

17. The access point of claim 14, wherein the first antenna is an adaptive antenna array and forms at least one directional antenna.

18. The access point of claim 14, wherein the plurality of carriers comprises orthogonal frequency division multiplexing frequencies.

* * * * *